Nov. 24, 1959     F. H. CLARKE     2,914,445
THAWING FROZEN TISSUE
Filed June 6, 1955
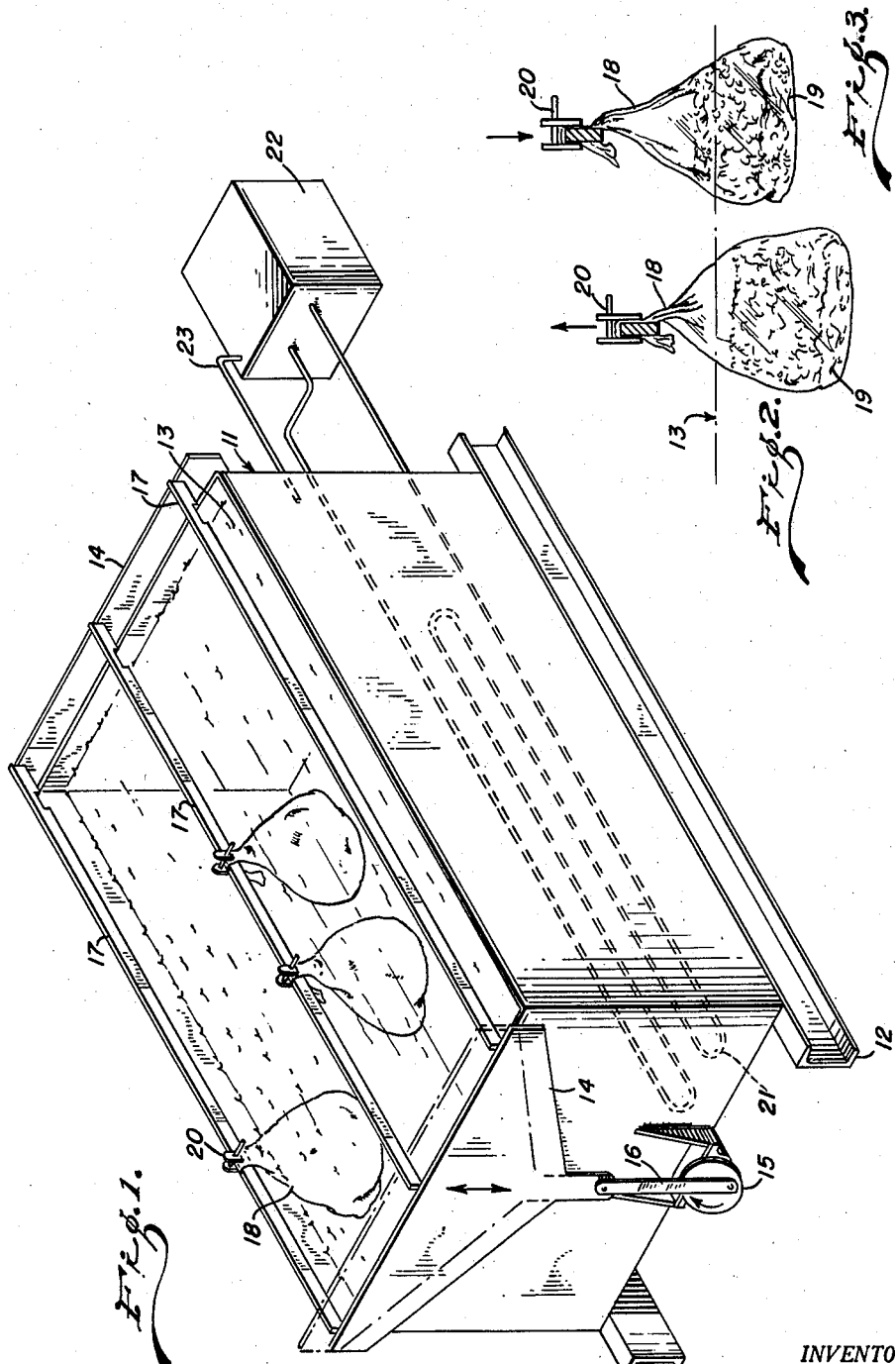
INVENTOR.
FRANK HOWARD CLARKE
BY
Samuel Branch Walker
ATTORNEY.

United States Patent Office 2,914,445
Patented Nov. 24, 1959

2,914,445

THAWING FROZEN TISSUE

Frank Howard Clarke, Pearl River, N.Y., assignor to American Cyanamid Company, New York, N.Y., a corporation of Maine Application June 6, 1955, Serial No. 513,563

4 Claims. (Cl. 167—74)

This invention relates to a method and apparatus for thawing frozen glandular tissue, and associated liquids.

In biological practice it is desirable to recover biological products from certain glandular tissues. For economic operation, it is necessary to collect a large quantity of glandular tissue and process it at one time in one location. Particularly, in the preparation of gamma globulin it is necessary to process human blood in order to separate the gamma globulin fraction which has proved very effective in the treatment of polio, measles, and for other purposes. One source of human blood is human placentae. Human placentae may be collected at hospitals, placed in suitable bags, such as polyethylene bags and promptly frozen. By so freezing the placentae, the blood and gamma globulin contained therein may be safely stored until sufficient placentae have been collected for convenient processing. The frozen placentae may be shipped to a central processing plant.

Pancreas may be frozen and processed for insulin recovery. Livers may be frozen and processed for various liver components.

It is necessary that the frozen glandular tissue be thawed for subsequent processing. Previously, it has been customary to allow placentae, for instance, to stand in tanks or on shelves at room temperature while thawing. If the material is thawed too rapidly or too slowly, there is a great tendency for bacteria to propagate in what is an excellent nutrient media which may form pyrogens. The presence of such pyrogens is very undesirable, and may prevent marketing of the product. Room temperature thawing causes product losses and is unsatisfactory from the standpoint of odor, sanitation, and neat plant practice.

By this invention it is found that one or more frozen placentae may be stored in polyethylene bags until ready to be thawed. A plurality of the placentae-containing polyethylene bags are attached to a reciprocating frame above a tank containing an aqueous liquid at a constant temperature. It is preferred that this liquid be physiological saline, which may be used for subsequent processing of the thawed placentae. By using properly proportioned quanties of saline liquid and placentae a sufficient quantity of the physiological saline for subsequent processing is used for the thawing and at the same time liquids which escape from any minor leaks in the polyethylene bags are recovered. The bags containing the glandular tissue such as placentae are raised and lowered in the liquid thereby causing the tissue to be gently massaged and as the tissue thaws, the liquids released are caused to flow with respect to the still frozen portions, thus causing a rapid and uniform thawing. The action is so smooth and gentle that neither the bags nor the tissue is damaged and uniformity of temperature is maintained. The temperature of the tank containing the liquid may be from 0° C. to 10° C., preferably within the range of about 4 to 8° C. The liquid is heated or chilled as is necessary to maintain its temperature within this range. The agitation in the tank liquid induced by the raising and lowering of the bags prevents local temperature differences. Conveniently heating or cooling of the tank liquid may be by circulating a fluid through coils attached to the bottom of the tank. A refrigeration machine may be used, and by using the choice of refrigeration or reversed cycle operation, heating or cooling of the tank is conveniently obtained. During the first stages of a thawing operation, heat is required, but as the end of the cycle approaches, heat gains from the room may be such that refrigeration is required to maintain the desired temperature.

In thawing of liquids containing proteinaceous materials, agitation usually results in foaming. If blood containing liquids are circulated by a pump, or even if the saline solution which may contain some blood is passed through a pump, foam may result, with associated problems. The gentle agitation resulting from raising and lowering bags in the saline liquid effectively controls the foam problem, and still permits efficient heat transfer.

Whereas this method may be used for thawing other glandular tissue such as pancreas for insulin or other extracts from other glands depending upon the conditions and economic advantages of each, it will be described with respect to a particular apparatus for the particular use of thawing placentae for gamma globulin production.

In the accompanying figures:

Figure 1 shows a tank containing the agitating frame and the bags containing placentae.

Figure 2 shows a bag of placentae immersed in the saline liquid.

Figure 3 shows a bag partly lifted from the saline liquid.

A tank 11 is supported on channel bars 12 and contains a thawing liquid 13. The thawing liquid is conveniently saline solution. The salinity is suitable for subsequent processing of frozen placentae which are to be thawed. About 0.85% sodium chloride in distilled water is preferred. Part or all of the saline required for subsequent processing is used as the thawing liquid. A total of about 600 to 700 milliliters of saline for each placenta is preferred. Mounted on the liquid tank is a reciprocating frame 14 which moves up and down. In addition to the up and down motion, the frame may have components of motion in other directions. The frame is reciprocated up and down by a suitable drive means 15 which may consist of an eccentric and a connecting rod 16. The reciprocating frame includes a number of support bars 17 which are mounted above the thawing liquid in the liquid tank. From the support bars depend a number of bags 18. The bags may conveniently by polyethylene, although rubber or other materials may be used. The bags contain frozen placentae 19. In practice the polyethylene bags are supplied to various hospitals. As placentae become available they are placed in these polyethylene bags, each of which contains one or more placentae. These are placed in a "deep freeze" to freeze them solid. The polyethylene bags containing the frozen placentae are then collected and shipped to a central processing station, at all times under refrigeration, and at that point a group of the polyethylene bags containing frozen placentae are then suspended from the support bars, each being attached thereto by a clamp 20. The bags are suspended at such a depth in the thawing liquid that as the reciprocating frame moves up and down the bags containing the placentae are moved in contact with the thawing liquid. As the interface between the thawing liquid and the ambient air moves up and down on the external surface of the bags there is induced a gentle massage or even agitation which, as soon as the frozen placentae and associated blood starts to thaw, causes the blood to flow smoothly in contact with the still frozen material so that there is very little temperature difference within the bag, and at the same time the motion of the bags moving up and down causes the thawing liquid to circulate within the liquid tank and thereby maintains substantially uniform temperature conditions within the liquid tank. Integral with the bottom of the tank is a heat exchange coil 21. The bottom of the tank is smooth. The heat exchange coil is attached to a compressor 22 so that a refrigeration cycle can be established and by either using a direct refrigeration cycle, circulating a refrigerating fluid, and introducing the refrigerating gas in the liquid phase and thereby securing refrigeration as the refrigerating gas vaporizes, or by using reverse cycle refrigeration and thus using the heat exchange coil as a condenser and liberating heat, it is convenient to either remove or supply heat to the thawing liquid in the liquid tank. A thermostat 23 immersed in the thawing liquid, controls the operation of the compressor 22, so that either heat or cold is supplied as is necessary to maintain the thawing liquid within the desired temperature range. During the initial thawing operations the amount of heat which is absorbed by the thawing placentae normally so chills the thawing liquid that additional heat must be supplied. Near the end of the thawing cycle when less heat is required, sufficient heat may be supplied through the walls of the liquid tank from the room in which the operation is being conducted so that refrigeration is required to maintain the thawing liquid within the desired range.

In processing frozen placentae to melt the blood contained therein for the recovery of gamma globulin, it is convenient to maintain a temperature of at least 4° C. and not more than 8° C. in the thawing liquid. 7° C. is a convenient control point for the refrigeration system. In operation it is found particularly convenient to have about 10 frozen placentae in each of a plurality of polyethylene bags and to raise and lower these bags in the physiological saline solution at a cyclic rate of approximately 2 to 10 seconds. This causes sufficient agitation to circulate the thawed liquid over the remaining frozen material, and yet is sufficiently gentle that it will not have any harmful effect on the partly thawed out or still frozen tissue, nor will it cause the bags to tear. The placentae are completely thawed within a period of 24 hours and are ready for the next step in the processing operation. After the placentae are melted they are macerated and mixed with physiological saline solution so as to form a dilute solution from which the tissue is removed, and by subsequent processing steps known to the art, the gamma globulin is recovered. By such an operation if any of the polyethylene bags are torn, which easily occurs when they have frozen contents, any small leaks of fluid from the interior of the polyethylene bags into the thawing liquid does not cause a loss of valuable constituents. It is desirable that a minimum of blood leak into the thawing liquid, but even considerable leakage does not cause foaming nor other problems.

As will be obvious other materials, other sizes of containers and other temperature ranges may be adapted for particular purposes as may be desired.

Minor variations in the apparatus and method are within the scope of my invention. Certain patentable aspects of my invention are set forth in the appended claims.

I claim:

1. A method for thawing frozen glandular tissue and retaining associated liquids in contact therewith which comprises: immersing flexible impervious bags having therein frozen glandular tissue in a tank of aqueous liquid, raising and lowering said tissue-containing bags in said aqueous liquid, so that at least part of the tissue contacting portion of the bags pass an aqueous liquid air interface, maintaining the temperature of said aqueous liquid between about 0° C. and 10° C., agitating the tissue and causing liquids associated with said tissue to circulate with respect to said tissue in said bags as the tissue and associated liquid melt by the hydraulic action of the aqeuous liquid air interface through said bags, while maintaining all portions of the melting tissue and associated liquid at substantially a uniform temperature, and foam free.

2. A method for thawing frozen glandular tissue and retaining associated liquid in contact therewith which comprises: immersing flexible impervious bags having therein frozen glandular tissue in a tank of saline solution, raising and lowering said tissue-containing bags in said saline solution, so that at least part of the tissue contacting portion of the bags pass a saline solution air interface, maintaining the temperature of said saline solution between about 0° C. and 10° C., agitating the tissue and causing liquids associated with said tissue to circulate with respect to said tissue in said bags as the tissue and associated liquids melt by the hydraulic action of the saline solution air interface through said bags, while maintaining all portions of the melting tissue and associated liquids at substantially a uniform temperature, and foam free.

3. A method for thawing frozen placentae and retaining associated blood in contact therewith which comprises: immersing flexible impervious bags having therein frozen placentae in a tank of saline solution, raising and lowering said bags in said saline solution, so that at least part of the tissue contacting portion of the bags pass a saline solution air interface, maintaining the temperature of said saline solution between about 4° C. and 10° C., agitating the placentae and causing blood associated therewith to circulate with respect to said placentae in said bags as they melt by the hydraulic action of the saline solution air interface through said bags, while maintaining all portions of the melting placentae and associated blood at substantially a uniform temperature, and foam free.

4. The method of claim 3 in which the quantity and salinity of the solution is that desired for the subsequent processing of the placentae, which processing includes the steps of retaining blood escaping from said bags in said saline solution, macerating the placentae, and mixing the macerated placentae, blood, and saline solution.

References Cited in the file of this patent

UNITED STATES PATENTS

| | | |
|---|---|---|
| 1,916,478 | Hohlweg | July 4, 1933 |
| 1,989,993 | Lautenschlager | Feb. 5, 1935 |
| 2,183,221 | Krug | Dec. 12, 1939 |
| 2,308,298 | Newhause | Jan. 12, 1943 |
| 2,429,909 | Allman | Oct. 28, 1947 |
| 2,662,520 | McMahon | Dec. 15, 1953 |
| 2,756,155 | Hale | July 24, 1956 |

FOREIGN PATENTS

| | | |
|---|---|---|
| 646,499 | Great Britain | Nov. 22, 1950 |

OTHER REFERENCES

Science, vol. 116, No. 3017, Oct. 24, 1952, p. 456.
Tressler: The Freezing Preservation of Foods, 2nd ed., 1947, The Avi Pub. Co., N.Y.C., p. 435.